(12) United States Patent
Amdisen et al.

(10) Patent No.: US 10,180,170 B2
(45) Date of Patent: Jan. 15, 2019

(54) OSCILLATION ABSORBER FOR A STRUCTURE

(71) Applicant: SIEMENS AKTIENGESELLSCHAFT, München (DE)

(72) Inventors: Camilla Hagemann Amdisen, Beder (DK); Fredrik Gustavsson, Långå (DK); Soeren Oestergaard Mathiasen, Give (DK); Torben Nielsen, Sporup (DK); Lars Brunsgaard Poulsen, Aarhus C (DK); Soeren Ole Rasmussen, Kolind (DK); Simon Roulund, Aarhus C (DK); Jesper Winther Staerdahl, Sunds (DK)

( * ) Notice: Subject to any disclaimer, the term of this patent is extended or adjusted under 35 U.S.C. 154(b) by 0 days.

(21) Appl. No.: 15/647,311

(22) Filed: Jul. 12, 2017

(65) Prior Publication Data

US 2018/0017125 A1    Jan. 18, 2018

(30) Foreign Application Priority Data

Jul. 14, 2016    (EP) ..................... 16179462

(51) Int. Cl.
*E04B 1/98*    (2006.01)
*F16F 7/10*    (2006.01)
(Continued)

(52) U.S. Cl.
CPC ............ *F16F 7/1022* (2013.01); *E04B 1/985* (2013.01); *F03D 13/20* (2016.05); *F16F 7/10* (2013.01);
(Continued)

(58) Field of Classification Search
CPC    F16F 7/1022; F16F 7/10; F03D 13/20; F03D 80/00; F05B 2260/964; E04B 1/985
See application file for complete search history.

(56) References Cited

U.S. PATENT DOCUMENTS 3,382,629 A * 5/1968 Reutlinger ............. E04H 12/00
                                                    174/42
7,819,624 B2 * 10/2010 Bonnet ................... F16F 15/08
                                                    415/119
(Continued)

FOREIGN PATENT DOCUMENTS

CN    1904406 A  *  1/2007  ............... F16F 1/40
CN    202132184 U  *  2/2012
(Continued)

OTHER PUBLICATIONS

Response filed in related EPO Application No. 16179462.3 (9 pages) (Year: 2018).*

(Continued)

*Primary Examiner* — Rodney Mintz
(74) *Attorney, Agent, or Firm* — Schmeiser, Olsen & Watts LLP

(57) ABSTRACT

Provided is an oscillation absorber for a structure, particularly a wind power plant, with a pendulum that is attachable to a component of the structure and a damper for dampening the motion of the pendulum, in which the pendulum passes through a containment ring that limits the deflection of the pendulum, wherein the containment ring is attachable to at least one wall of the structure.

14 Claims, 3 Drawing Sheets

Figure 1:
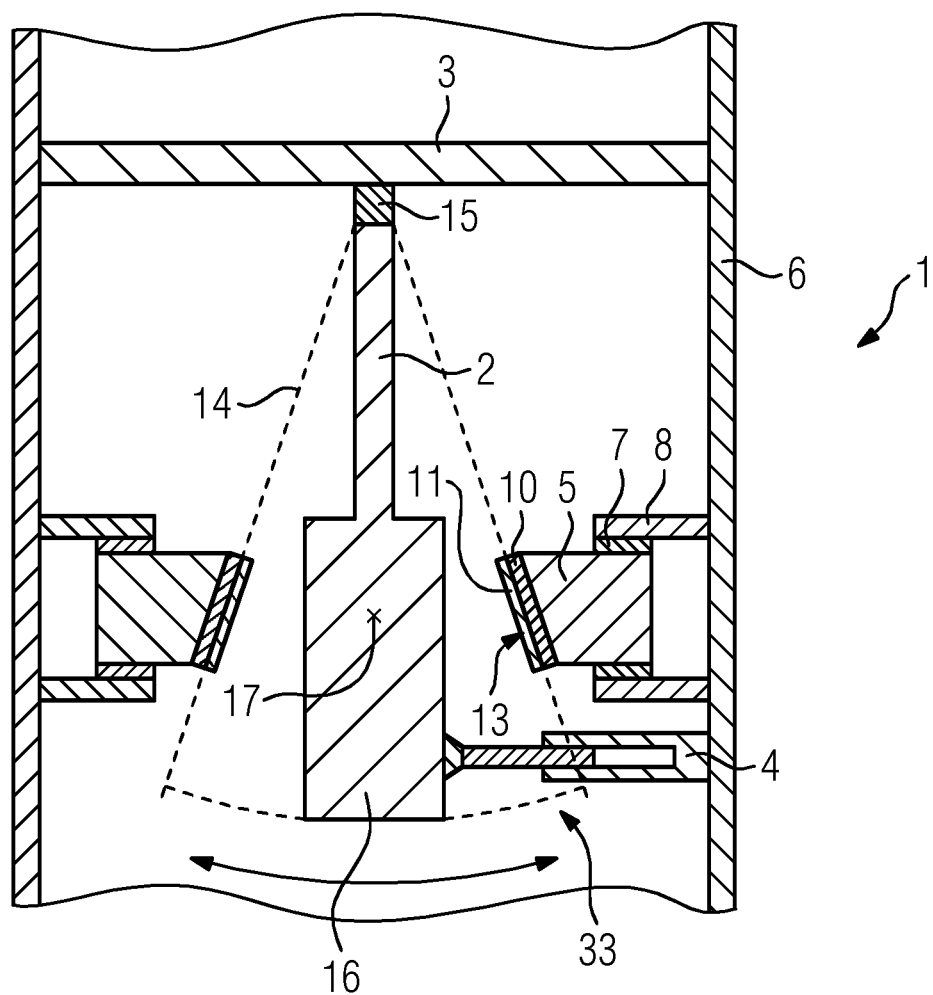

(51) Int. Cl.
*F03D 13/20* (2016.01)
*F03D 80/00* (2016.01)

(52) U.S. Cl.
CPC ........ *F03D 80/00* (2016.05); *F05B 2260/964* (2013.01)

(56) References Cited

U.S. PATENT DOCUMENTS

| | | | | |
|---|---|---|---|---|
| 7,931,438 | B2* | 4/2011 | Schellings | ................ F03D 1/00 415/119 |
| 8,418,413 | B2* | 4/2013 | Marmo | ................... E02D 27/42 52/167.4 |
| 9,683,556 | B2* | 6/2017 | Ollgaard | ................. F03D 80/00 |
| 2007/0041829 | A1* | 2/2007 | Bonnet | ..................... F03D 1/06 415/119 |
| 2007/0090269 | A1 | 4/2007 | Bonnet | |
| 2007/0108366 | A1* | 5/2007 | Kim | ..................... F16F 7/1022 248/562 |
| 2008/0145222 | A1* | 6/2008 | Schellings | ................ F03D 1/00 416/31 |
| 2010/0314883 | A1* | 12/2010 | Ollgaard | ................. F03D 80/00 290/55 |
| 2011/0056151 | A1* | 3/2011 | Marmo | ................... E02D 27/42 52/167.4 |
| 2012/0063915 | A1* | 3/2012 | Kawabata | ................. F16F 7/10 416/244 R |
| 2012/0121413 | A1* | 5/2012 | Rodriguez Tsouroukdissian | ........ F03D 7/02 416/1 |
| 2013/0106109 | A1* | 5/2013 | Richert | ................. F03D 7/0208 290/44 |
| 2015/0322923 | A1* | 11/2015 | Konitz | .................... F16F 7/116 416/144 |
| 2016/0131220 | A1* | 5/2016 | Siemens | ................... F16F 7/10 188/378 |
| 2016/0252079 | A1* | 9/2016 | Ollgaard | ................. F03D 80/00 52/745.17 |
| 2017/0044763 | A1* | 2/2017 | Shu | ........................ E04B 1/985 |
| 2017/0241151 | A1* | 8/2017 | Dogan | ................... E04H 9/023 |
| 2018/0195345 | A1* | 7/2018 | Smith | ...................... E06C 9/02 |

FOREIGN PATENT DOCUMENTS

| | | | | | |
|---|---|---|---|---|---|
| CN | 202833843 | U | * | 3/2013 | |
| CN | 103452747 | A | * | 12/2013 | |
| EP | 0075877 | A2 | * | 4/1983 | ........... B64C 27/001 |
| EP | 1008747 | A2 | * | 6/2000 | ............. F15F 7/104 |
| WO | WO 2014102016 | A1 | * | 7/2014 | ............. F16F 9/483 |

OTHER PUBLICATIONS

European Search Report dated Feb. 17, 2017; Application No. 16179462.3; 7 pgs.

* cited by examiner

OSCILLATION ABSORBER FOR A STRUCTURE

CROSS-REFERENCE TO RELATED APPLICATION

This application claims priority to European Application No. 16179462.3 having a filing date of Jul. 14, 2016, the entire contents of which is hereby incorporated by reference.

FIELD OF TECHNOLOGY

The following relates to an oscillation absorber for a structure, particularly a wind power plant, with a pendulum that is attachable to a component of the structure and a damper for dampening the motion of the pendulum. Additionally the following relates to a structure, particularly a wind power plant.

BACKGROUND

It is known in the state of the art that tall structures, for example wind power plants, are prone to oscillations of the structure. One way to dampen these oscillations is to use a pendulum that is attached to a component of the structure and to dampen the oscillations of that pendulum, for example by using a damper that is based on friction or on eddy currents, and thereby reduce the oscillation of the structure.

For this type of oscillation dampening it is advantageous to use a relatively long and heavy pendulum. The use of such a pendulum can be problematic, since it creates a zone of danger that should be avoided, e. g. by service personal of a wind power plant during the servicing or the construction of the wind power plant. Large deflections of a pendulum can also result in the pendulum hitting a wall of the structure and potentially damaging this wall.

SUMMARY

An aspect relates to improving the oscillation absorber discussed above to reduce the danger of damage to the structure and to ensure safe passages for service personal.

The problem is solved by an oscillation absorber according to the initial description, wherein the pendulum passes through a containment ring that limits the deflection of the pendulum, wherein the containment ring is attachable to at least one wall of the structure.

The oscillation absorber according to embodiments of the present invention can reduce the oscillations of the structure, especially of a wind turbine power plant, and therefore the loading of the structure. Through the use of the containment ring according to embodiments of the present invention the maximum deflection of the pendulum can be reduced to a save limit. Preferably this reduction of the deflection amplitude is possible without damage to the containment ring. This goal can be reached by providing parts of the containment ring that allow for elastic deformation or by an arrangement in which the containment ring works in conjunction with other devices, e. g. additional braking devices for the pendulum, that absorb kinetic energy.

The oscillation absorber is limited in its working area by the containment ring. The use of the containment ring limits the zone of danger to a conical section with an opening angle that is essentially defined by the diameter of the containment ring. It is therefore easy to plan for safety limits for service personal and other equipment and reliably avoid damage to the structure by excessive amplitudes of the pendulum.

The pendulum can have a cylindrical mass attached the lower end of the pendulum. This cylindrical mass can be surrounded by the containment ring. The pendulum can have a length of for example one to five meters. The mass of the pendulum can be larger than 100 kg for example 1 t. The damper can, for example, be based on friction, on a deformation of an elastomer or on the generation of eddy currents.

The containment ring can be made of robust material, for example steel. It can be attached to the wall of the structure at two or more positions, with the positions of attachment preferably being located on opposite sides of the containment ring.

It is possible that, the inner surface of the containment ring that faces the pendulum is at least partially covered by a layer of elastic material. The elastic material can have a thickness of 1-30 cm. The elastic modulus of the elastic material can be smaller than the elastic modulus of the material of the containment ring itself by a factor of 10, 20, 40 or 100. The elastic material is therefore less stiff than the material of the containment ring itself. The elastic modulus of the elastic material can be smaller or equal to 10, 5, 1, 0.5 or 0.1 GPa. The elastic material can be rubber, an elastomer foam or plastic. The layer of the elastic material can provide a fender or a bumper for the pendulum that can be elastically deformed without damaging the containment ring or the structure while dissipating kinetic energy of the pendulum. Additionally or alternatively a relevant section of the pendulum that can collide with the containment ring at a certain deflection can be covered by a layer of elastic material.

The containment ring can be attachable to the wall via at least one shear dampener that dampens a lateral movement of the containment ring with respect to the wall. The material of the shear dampener, which can for example be an elastomer, is sheared, when a lateral movement of the containment ring occurs. This shearing motion causes internal friction and therefore dissipates kinetic energy. A shearing dampener can be implemented by providing a pad of an elastic material between an element that is fixed to the wall and an element that is fixed to the containment ring. It is possible to use two pads of dampening materials at each position at which the containment ring is connected to the wall. One of the pads can be arranged above and one below a connection element of the containment ring. The pads can be arranged between the connection element and a bracket fixed to the wall. The bracket can for example be fixed to the wall by providing welding bushings at the bracket. There can for example be two rows of welding bushings, and each of these rows can contain four welding bushings.

The use of shear dampeners provides an additional or alternative way of absorbing the kinetic energy of the pendulum to the use of the layer of the elastic material. Due to the attachment to the wall via the shear dampener the containment ring is moveable to a certain degree. This can reduce the stress on further components of the oscillation absorber and the structure, especially on the bearing of the pendulum and on components connected to the bearing. Sudden changes of the angular velocity of the pendulum can create high frequency oscillation that increases the wear of the bearing of the pendulum and of connected components. These sudden changes in momentum at the time of contact with the containment ring can be reduced by using a containment ring that has a moment of inertia that is lower that the moment of inertia of the pendulum, especially lower by a factor of at least three or ten.

The containment ring and/or the layer of elastic material can consist of several separate segments. The segments of the containment ring can be attached to each other, e. g. by screws. The segments of the layer of elastic material can be attached to the containment ring and/or to each other. The use of sections for the containment ring and/or its further components allows for easier transport and handling. Especially segments of the containment ring and/or the layer of elastic material can be provided in sizes that can be transported by a services lift of the structure.

The relative position of the pendulum and the containment ring can be chosen in such a way that the center of gravity of the pendulum lies within the vertical extension of the containment ring, when the deflection of the pendulum is sufficient for the pendulum to contact the containment ring. In this case a contact between the pendulum and the containment ring does generate only a small torque or no torque about the center of mass of the pendulum. This reduces the stress on the bearing of the pendulum and on connected components.

The inner surface of the containment ring or of the layer of elastic material that is facing the pendulum can be covered by a low friction material providing a lower coefficient of friction between the low friction material and the contact material of the contact surface of the pendulum than the coefficient of friction between the contact material and the material of the containment ring and/or the elastic material. This can especially be the case for the coefficient of friction concerning a sliding friction. The contact surface of the pendulum is the area of the pendulum that contacts the containment ring, when the deflection of the pendulum is sufficiently high. By reducing the friction between the pendulum and the containment ring the dampening of a circumferential component of a movement of the pendulum can be lowered. Therefore, the stress on the bearing of the pendulum and connected components can be reduced.

In the mounting position the inner surface of the containment ring facing the pendulum can be slanted with respect to the vertical direction. This slant angle can be chosen such, that it is essentially the same as the deflection angle of the pendulum at which the pendulum contacts the containment ring. This maximizes the contact surface between the pendulum and the containment ring when these components are in contact and therefore the capacity of the containment ring for absorbing momentum from the pendulum.

The oscillation absorber can contain a braking unit that can be enabled to exert an additional dampening force on the motion of the pendulum, wherein the braking unit is activated, when a lateral displacement and/or a lateral velocity and/or a lateral acceleration of the containment ring and/or a force acting on the containment ring exceeds a given threshold. The displacement, velocity, acceleration and/or force can be measured by a sensor and a control unit of the oscillation absorber can compare the measured values with the threshold and activate the braking unit, if the threshold is surpassed. It is however preferable, to use mechanical couplings, that automatically trigger a mechanical brake when the threshold is surpassed by the displacement, the velocity, the acceleration and/or the force.

If the force is measured by a force sensor, the force sensor is preferably placed in such a way, that forces are essentially only registered, once the shearing of the shear dampener and/or the compression of the layer of the elastic material exceed a given threshold. The threshold can be chosen close to the shear or compression at which forces due to the shear or the compression are no longer linear to the amount of shear or compression and/or at which the shear or compression is no longer reversible. The braking unit can be attached to the containment ring or to the wall.

The braking unit can be enabled by moving a locking element from a locking position to an unlocking position or vice versa, wherein the locking element is motion coupled to the containment ring. E. g. a hook can be unlatched due to a movement of the containment ring relative to the walls of the structure to enable the braking unit. The motion coupling can be achieved in such a way that small displacements are not transmitted. It is for example possible, that a coupling element that is connected to the locking element may freely move with respect to the containment ring within an area that is limited by a stop attached to the containment ring. While the coupling element is not in contact with the stop, movements of the containment ring are not transmitted to the locking element. Once the displacement of the containment ring is sufficiently strong that the coupling element contacts the stop, the motion is transmitted.

The motion coupling can contain a dampening element, e. g. a spring or an elastomer, to dampen the transmission of high frequency vibrations that could lead to an accidental triggering of the braking unit. The locking element can be attached to a wire that is connected to the wall of the structure or a component connected to the wall, when the oscillation absorber is mounted in the structure, and that is threaded through at least one stopper ring that is attached to the containment ring, wherein the stopper ring exerts a lateral force on the wire, when the displacement of the containment ring exceeds the threshold or a further threshold. It is preferable, that the component is rigidly connected to the wall and/or the stopper ring is rigidly connected to the containment ring. The component that is attached to the wall can be a bracket that is used to fix the containment ring to the wall via a sheer damper. Preferably an upper and a lower bracket are used, that are each separated by a sheer damper from the containment ring. In this case one of the brackets can be used to attach the wire and the other bracket can provide a guiding element to guide the wire in such a way that it does not touch the stopper ring when the containment ring is in an equilibrium position in which no forces from the pendulum are applied to the containment ring. To achieve redundancy it is possible to use two trigger mechanisms. Each of the brackets can have a separate wire attached and provide a guiding element for the wire of the other bracket. Both wires are connected to the locking element and the braking unit can be enabled by pulling either of these wires.

The activation of the braking unit can be independent of the direction of the lateral displacement and/or the lateral velocity and/or the lateral acceleration of the containment ring and/or of the direction of the force acting on the containment ring. The activation of the braking unit can therefore only depend on the absolute value of the displacement, the velocity, the acceleration and/or the force.

The oscillation absorber can contain a coupling element that is coupled to the pendulum and guided by a guiding element of the braking unit, wherein the braking unit exerts a frictional force on the coupling element and/or the guiding element when it is enabled. If the braking unit is disabled, the exerted friction can be negligible or very low. The friction is therefore increased by enabling the braking unit. It is for example possible to use a friction rod brake in which a rod is attached to the pendulum and passes through a sliding bearing that is attached to the containment ring or the wall. When the braking unit is activated, the friction of the sliding bearing can be increased, e. g. by increasing the radial pressure on the rod in the sliding bearing.

In another example the braking unit can comprise a wire drum as a guiding element that is sprung to keep a wire that connects the wire drum with the pendulum as the coupling element at essentially a constant tension. If this wire drum is coupled to another rotating element by a friction clutch, a rotation of this element can transfer an angular momentum on the wire drum via friction to modify the tension of the wire. This can be used to brake the pendulum. If the distance between the pendulum and the wire drum increases and the tension of the wire is increased, a braking force is exerted on the pendulum. The other rotating element can be driven by a clock spring or by spooling wire onto the other rotating element and pulling this wire of the rotating element via a dropping weight. The unspooling of the clock spring or the wire can be stopped by a locking element. The removal of the locking element, as discussed above, can therefore trigger a braking action. An advantage of a purely mechanical braking action is that the enabling of the braking unit is possible even if there is no power available.

In an alternative embodiment it is possible, that the braking unit comprises at least one expandable element that is expanded to limit the deflection of the pendulum, when the braking unit is enabled. The expandable element can be a bag that is filled by air or foam. The filling of the bag can be driven by a compressor or a gas cartridge. The bag can expand into a space between the containment ring and/or the wall and the pendulum, therefore limiting and dampening the movement of the pendulum.

In addition to the oscillation absorber embodiments of the invention concerns a structure, particularly a wind power plant, characterized in that it contains an oscillation absorber according to the present invention. The pendulum of the oscillation absorber is attached to a component of the structure and the containment ring is attached to at least one wall of the structure. The containment ring can be attached to the wall via at least one shear damper. The inner surface of the containment ring can be slanted with respect to the vertical direction. If a braking unit is used that is triggered by a wire, as discussed above, the wire can be attached to the wall or a component connected to the wall.

BRIEF DESCRIPTION

Figure 2:
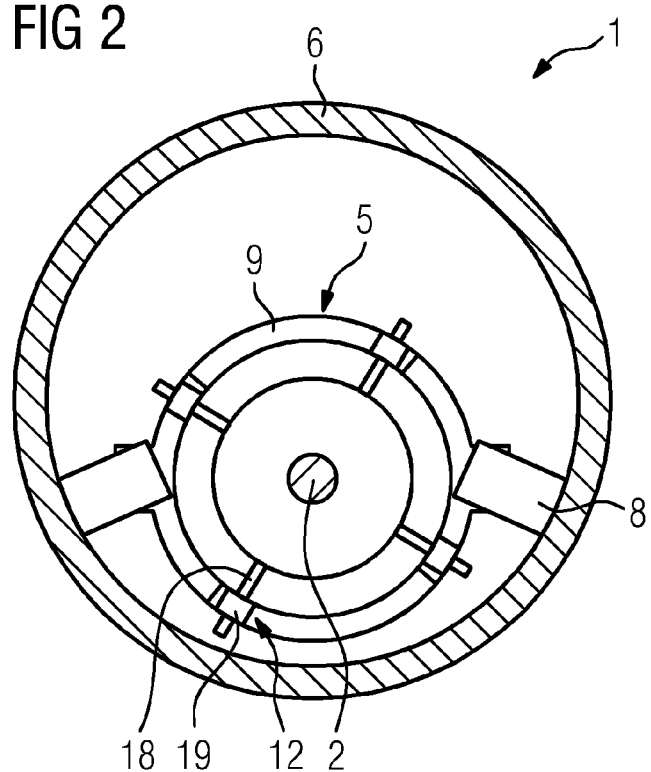
Figure 3:
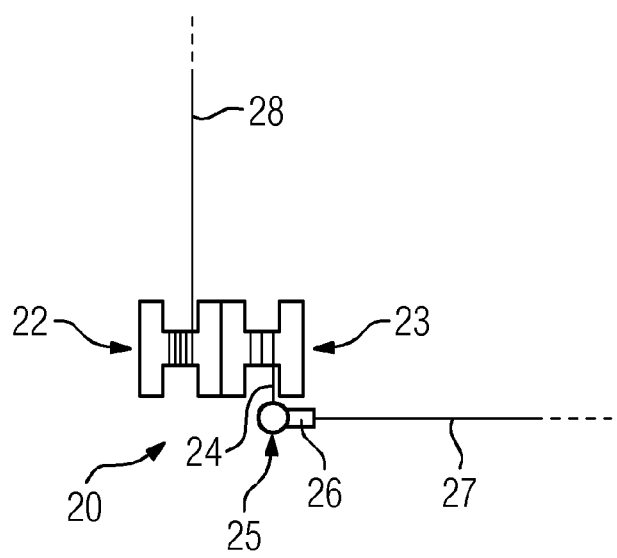
Figure 4:
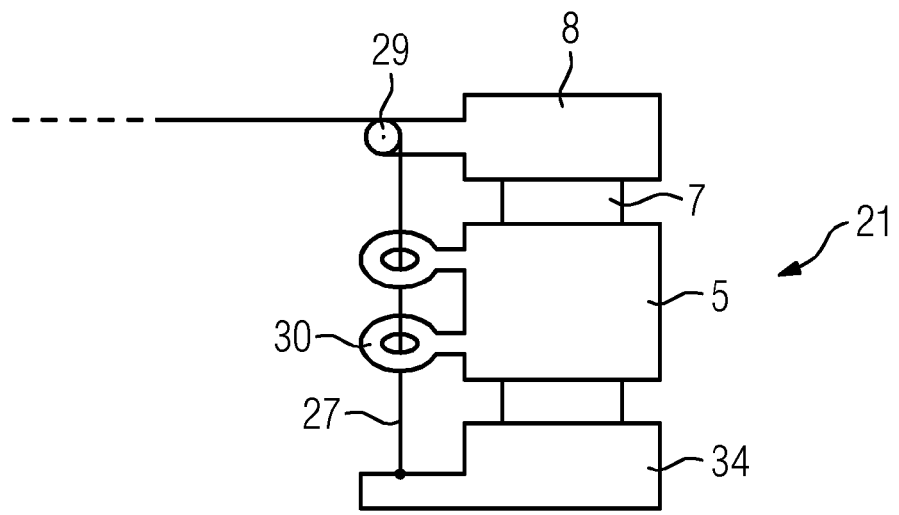
Figure 5:
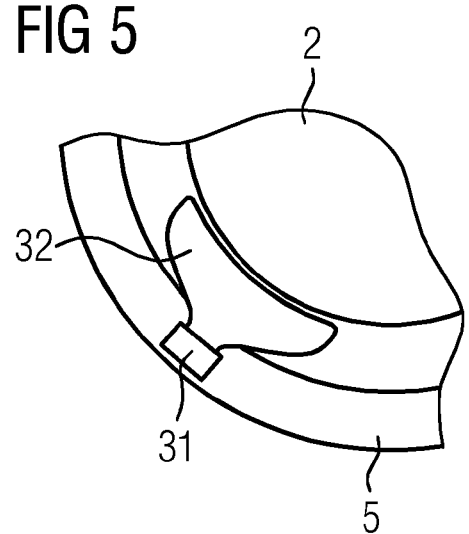

Some of the embodiments will be described in detail, with reference to the following figures, wherein like designations denote like members, wherein:

FIG. 1 a detail of a structure according to embodiments of the present invention containing an oscillation absorber according to embodiments of the present invention, FIG. 2 a different view of the structure shown in FIG. 1; and FIG. 3-5 alternative braking units that can be used in alternated embodiments of the oscillation absorber according to embodiments of the present invention.

DETAILED DESCRIPTION

FIGS. 1 and 2 show different views of a structure 1, for example of the tower of a wind power plant that contains an oscillation absorber 33. The oscillation absorber 33 contains a pendulum 2 that is attached to a component 3, in this case a cross beam, of the structure 1. The pendulum 2 is attached to the component 3 via a bearing 15 that allows for a deflection of the pendulum 2 in two directions. The pendulum 2 contains a mass 16 with a cylindrical shape that is attached to its lower end. If there are oscillations of the structure 1, some of the oscillation energy is transferred to the pendulum 2. The oscillation of the pendulum 2 is dampened by a damper 4. FIG. 1 shows a simple oscillation damper with a plate sliding between two further plates. There are however a lot of possible dampers for the oscillation absorber 33 known in the art. As an alternative to the damper 4 a damper based on the generation of eddy currents or the deformation of an elastomer could be used. There are also many possible ways to connect the damper 4 to the wall 6 of the structure or other components of the structure and to the pendulum 2. Preferably more than one damper 4 can be used. The damper 4 dampens the oscillation of the pendulum and converts the kinetic energy of the pendulum into heat or power that can be used for other purposes. Therefore, the oscillation energy of the structure 1 is first transferred to the pendulum 2 and then to the dampener 4 where it is dissipated or used.

To limit the zone of danger 14, in which objects can be hit by the oscillating pendulum 2, and to prevent the pendulum 2 from hitting the wall 6 of the structure 1 and damaging them, a containment ring 5 is used in the oscillation absorber 33. The pendulum passes vertically through the containment ring 5. The containment ring 5 limits the deflection of the pendulum 2 and therefore defines the zone of danger 14. It also ensures, that the pendulum 2 cannot hit the wall 6.

The containment ring 5 is attached to the wall 6 via the shear dampers 7. The shear dampers 7 consists of an elastomer, that is deformed, when the pendulum 2 contacts the containment ring 5 and excerpts a lateral force on the containment ring 5. The shear dampeners are arranged between the containment ring 5 and brackets 8 that are used to connect the containment ring 5 to the wall 6 of the structure 1. The use of the shear dampers 7 allows for a certain amount of lateral movement of the containment ring 5, which avoids damage to the containment ring 5 and the pendulum 2, when the pendulum hits the containment ring 5. Additionally stress on the bearing 15 and the component 3 due to this collision is reduced. The stress on these components can be further reduced by using a layer of elastic material 10 on the surface of the containment ring 5 that can be in contact with the pendulum 2. Rubber, an elastomer foam or plastic can be used as elastic material 10. A homogeneous layer of elastic material can be used, but it can be advantageous, to use a structured material that can e. g., include air bubbles.

Since only the radial movement of the pendulum 2 should be limited, it can be advantageous to reduce the friction between the pendulum 2 and the containment ring 5 or the elastic layer 10. Such a friction would reduce the circumferential component of the movement of the pendulum 2 and therefore put additional stress on the bearing 15 and the component 3. This additional stress can be avoided by a adding a layer of low friction material 11 onto the elastic material 10 or directly onto the containment ring 5.

The stress on the bearing 15 and the component 3 can be reduced even further, when the relative position of the pendulum 2 and the containment ring 5 is chosen in such a way that the center of gravity 17 of the pendulum 2 lies within the vertical extension of the containment ring 5, when the deflection of the pendulum 2 is sufficient for the pendulum 2 to contact the containment ring 5. To improve the transfer of kinetic energy from the pendulum 2 to the containment ring 5, it is also advantageous to use a containment ring 5 with an inner surface 13 of the containment ring facing the pendulum 2, which is slanted with respect to the vertical direction. The slanting can be chosen in such a way, that the surface of the pendulum 2 is lying essentially flat on the inner surface 13 of the containment ring 5, when the pendulum 2 is starting to contact the containment ring 5.

As indicated in FIG. 2, the containment ring 5 can consist of several segments 9. These segments 9 can be connected to each other by e. g. screws. The layers of the materials 10, 11, which are not shown in FIG. 2 for greater clarity, can already be attached to these segments or added separately after connecting the segments. Using a containment ring 5 that consists of several segments 9 allows for easier servicing of the oscillation absorber and easier construction of the structure 1, since the segments 9 are easier to handle and transport, e. g. on a service elevator.

As shown in FIG. 2, the oscillation absorber contains four braking units 12 that can be enabled to exert an additional damping force on the motion of the pendulum 2. The braking units 12 consist of a coupling element 18, that is coupled with the pendulum and a guiding element 19. The coupling element 18 is a rod that is attached to the pendulum 2 via a bearing that is not shown. The guiding element 19 consists of a tube that guides the coupling element 18. The guiding element 19 is connected via a further bearing to the containment ring 5. If the braking unit 12 is not activated, the coupling element 18 is guided by the guiding element 19 with a low friction. When the braking unit 12 is enabled, an actor in the guiding element is activated to exert a force on the coupling element 18 and therefore increase the friction between the coupling element 18 and the guiding element 19. Due to this friction the kinetic energy of the pendulum 2 is reduced.

The braking 12 unit is activated, when a force acting on the containment ring 5 exceeds a given threshold. To determine the force on the containment ring, several force sensors on the containment ring are used, that are not shown. Advantageously the force sensors are arranged between the containment ring 5 and the elastic material 10. In this case the forces measured by the force sensor vary sharply, when the force exceeds a limit, up to which an elastic compression of the elastic material 10 is possible. In alternative embodiments a lateral displacement and/or a lateral velocity and/or a lateral acceleration of the containment ring 5 could be measured in addition or as an alternative to the force and evaluated to trigger the activation of the braking unit 12.

In many applications it can be advantageous to use a braking unit that is independent of a supplied power and can be triggered and used by purely mechanical means. An example of such a braking unit 20 is shown in FIGS. 3 and 4. FIG. 3 shows the braking unit 20 itself and FIG. 4 shows the activation means 21 of the braking unit 20. The braking unit 20 consists of a guiding element 22 that is a spool, and a further spool 23 that are coupled by a friction clutch to transmit frictional forces between the spool 23 and the guiding element 22. The guiding element 22 is sprung in such a way, that the coupling element 28, in this case a wire that is connected to the pendulum 2, is held at a constant tension. The spool 23 contains a wire 24 that is connected to a weight 25 that can drop in the direction orthogonal to the image plane in FIG. 3 and that is held in place by the locking element 26, e. g. a hook. If the locking element 26 is removed, the weight 25 drops down, pulling the wire 24 from the spool 23. The rotation of the spool 23 will transmit forces to the guiding element 22, that increase the tension on the wire and therefor exert forces on the pendulum 2, that can be used to brake the pendulum 2.

The locking element 26 can be pulled from the locking position shown in FIG. 3 to an unlocking position in which it releases the weight 25 by the wire 27. The wire 27 provides a motion coupling between the locking element 26 and the containment ring 5. This is shown in detail in FIG. 4. The containment ring 5, of which only a radial extension is shown in FIG. 4, is held between two brackets 8, 34, that are attached to the wall 6 of the structure 1. Shear dampers 7 are installed between the bracket 8, 34 and the containment ring 5. Therefore the containment ring 5 can move with respect to the brackets 8, 34. The wire 27 that is shown in FIG. 3 and FIG. 4 is connected to the lower bracket 34. It is also guided by a guiding element 29 fixed to the upper bracket 8. Between the fixing point at the lower bracket 34 and the guiding element 29 the wire is threated through two stopper rings 30 which are attached to the containment ring 5. If the containment ring 5 is in a neutral position, which is shown in FIG. 4, the wire 27 is not in contact with the stopping rings 30 and is essentially straight between the brackets 8, 34. If the position of the containment ring changes sufficiently, so that the stopping rings 30 touch the wire 27, a further displacement of the containment ring 5 will deform the wire 27 from the straight line shape and therefore exert a pull on the locking element 26. A sufficiently large displacement of the containment ring 5 will therefore pull the locking element 26 into an unlocking position, in which the weight 25 is released and will therefore trigger a braking action.

The arrangement in shown in FIGS. 3 and 4 can be further improved, by an oscillation damper, e. g. a spring or an elastomer that is installed between the wire 27 and the stopping element 26 to dampen high frequency oscillations, which could lead to an accidental movement of the locking element to an unlocking position.

FIG. 5 shows a braking unit 31 for an alternative embodiment of the oscillation absorber. The braking unit 31 consists of an expandable element 36 that can be expanded by an actuator, e. g. a compressor, or a gas cartridge, by filling the expandable element 32, e. g. a bag, with gas or foam. The expandable element 32 is shown in its expanded position in FIG. 5. If the expandable element 36 is not expanded, it consists of a small package within the braking unit 31. By expanding it into the zone of danger 14, in which the pendulum 2 can move, the movement of the pendulum 2 can be limited. Due to elastic deformations of the expandable element 22, the kinetic energy of the pendulum 2 can be reduced.

In the example shown in FIG. 5 the braking unit 31 is attached to the containment ring 5. It is however alternatively or additionally possible to add braking units 31 with an expandable element 32 to the wall 6 of the structure.

Although the present invention has been described in detail with reference to the preferred embodiment, the present invention is not limited by the disclosed examples from which the skilled person is able to derive other variations without departing from the scope of the invention.

For the sake of clarity, it is to be understood that the use of 'a' or 'an' throughout this application does not exclude a plurality, and 'comprising' does not exclude other steps or elements.

The invention claimed is:

1. An oscillation absorber for a wind power plant having a structure, wherein the oscillation absorber comprises a pendulum that is attachable to a component of the structure and a dampener for dampening motion of the pendulum, wherein the pendulum passes through a containment ring that limits deflection of the pendulum, wherein the containment ring is attachable to at least one wall of the structure, and at least one of:

(i) wherein the containment ring includes an inner surface that faces the pendulum and the inner surface is at least partially covered by a layer of elastic material, or (ii) wherein the containment ring is attachable to the wall via at least one shear dampener that dampens a lateral movement of the containment ring with respect to the wall.

2. The oscillation absorber according to claim 1, wherein the inner surface of the containment ring is covered by a low friction material providing a lower coefficient of friction between the low friction material and a contact material of a contact surface of the pendulum than the coefficient of friction between the contact material and the material of the inner surface of the containment ring.

3. The oscillation absorber according to claim 1, wherein at least one of the containment ring and the layer of elastic material includes several separate segments.

4. The oscillation absorber according to claim 1, wherein the containment ring includes several separate segments.

5. The oscillation absorber according to claim 1, wherein a relative position of the pendulum and the containment ring is chosen in such a way that a center of gravity of the pendulum lies within a vertical extension of the containment ring, when the pendulum contacts the containment ring.

6. The oscillation absorber according to claim 1, wherein the layer of elastic material that is facing the pendulum is covered by a low friction material providing a lower coefficient of friction between the low friction material and a contact material of a contact surface of the pendulum than the coefficient of friction between the contact material and the material of the elastic material.

7. The oscillation absorber according to claim 1, wherein in a mounting position an inner surface of the containment ring facing the pendulum is slanted with respect to a vertical direction.

8. The oscillation absorber according to claim 1, wherein the oscillation absorber contains a braking unit capable of exerting an additional dampening force on the motion of the pendulum, wherein the braking unit is activated when at least one of the following conditions exceeds a given threshold:
   a lateral displacement of the containment ring,
   a lateral velocity of the containment ring,
   a lateral acceleration of the containment ring, and
   a force acting on the containment ring.

9. The oscillation absorber according to claim 8, wherein the activation of the braking unit is independent of the direction of the condition exceeding the given threshold.

10. The oscillation absorber according to claim 8, wherein the oscillation absorber contains a coupling element that is coupled to the pendulum and guided by a guiding element of the braking unit, wherein the braking unit exerts a frictional force on at least one of the coupling element and the guiding element when the braking unit is enabled.

11. The oscillation absorber according to claim 8, wherein the braking unit comprises at least one expandable element that is expanded to limit the deflection of the pendulum, when the braking unit is enabled.

12. The oscillation absorber according to claim 8, wherein the braking unit is enabled by moving a locking element from a locking position to an unlocking position or vice versa, wherein the locking element is motion coupled to the containment ring.

13. The oscillation absorber according to claim 12, wherein the locking element is attached to a wire that is connected to the wall of the structure or a component connected to the wall, when the oscillation absorber is mounted in the structure, and that is threaded through at least one stopper ring that is attached to the containment ring, wherein the stopper ring exerts a lateral force on the wire, when the displacement of the containment ring exceeds the threshold or a further threshold.

14. A wind power plant having the oscillation absorber according to claim 1.

\* \* \* \* \*